3,398,181
DIMETHYLTHIOCARBAMOYL S-ALKYL-
DITHIOCARBONATES
Kenneth S. Karsten, Westport, and William F. Russell, Norwalk, Conn., assignors to R. T. Vanderbilt Company, Inc., New York, N.Y., a corporation of New York
No Drawing. Filed May 7, 1965, Ser. No. 454,180
2 Claims. (Cl. 260—455)

ABSTRACT OF THE DISCLOSURE

Compounds having the structural formula

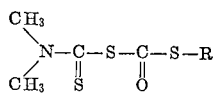

where R represents an alkyl group having from 1 to about 4 carbon atoms and the method of combatting unwanted biological life by applying such compounds to an area to be treated, such as eradicating unwanted fish, incorporating it into vinyl chloride resins, controlling insects and combatting fungi on agricultural crops, preserving cellulosic material from attack by organisms in the soil, and combatting paper mill slime.

---

This invention relates to biocidal materials and compositions, and a method of using them.

There is need for a toxicant which is effective for eradicating or controlling various forms of life including but not limited to bacteria, fungi and other micro- and macro-organisms in various media and environments such as agricultural crops, natural and artificial bodies of water, textile and other fabrics, and plastic materials such as vinyl formulations.

More specifically there is need for a toxicant which is capable of eradicating the fish from a body of water. Such a product would be useful for treating a lake which has become so overpopulated that it can produce only small fish. It would also be useful for a body of water which has become contaminated with goldfish, carp or other trash fish. It could also be used to rid streams and lakes of poisonous fish or dangerous fish such as the piranha of Brazil which is a menace to man and to other warm-blooded animals. Rotenone has been used in the past for such purposes, but a cheaper and more effective material is needed.

It is an object of this inveniton, therefore, to provide a means for eradicating the fish in a body of water. It is a further object to provide a fish toxicant which will become harmless in a short time so that a new population of more desirable fish can be introduced safely soon after application.

Still another object of the invention is to obtain a toxicant which is effective for killing or controlling fungi in plasticized vinyl formulations, pests which attack agricultural crops, and organisms which attack cellulosic fibers buried in soil.

Still another object of the invention is to provide a compound which will eradicate or control slime which frequently is found in the paper mill.

According to the present invention, the new class of biocides, dimethylthiocarbamoyl S-alkyl dithiocarbonates

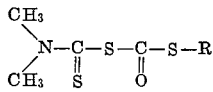

wherein R represents an alkyl group having from 1 to about 4 carbon atoms, has been found to be effective in various media in attacking or controlling various unwanted forms of life, such as fish, bacteria, fungi and insects. In particular, the compounds of the invention have been found to be effective as fish toxicants which degrade or decompose when in contact with air and water to form harmless products. The compound, therefore, can be used to kill unwanted fish in a body of water and after the compound has decomposed the body of water can be restocked with game fish or other desirable fish.

The biocides of the invention are prepared very readily and in good yield by treating an aqueous solution of a soluble salt of an alkyldithiocarbamic acid with an alkyl chlorothiolformate:

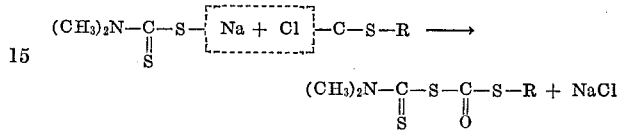

The following example illustrates a method of preparing the compounds of the invention. Although the procedure illustrated is for the preparation of the S-methyl compound, a similar procedure can be used for preparing other lower alkyl derivatives including the ethyl, propyl and butyl derivatives.

EXAMPLE 1

N,N - dimethylthiocarbamoyl S - methyldithiocarbonate was prepared by adding 140 lb. of a 23.5% by weight aqueous solution of sodium dimethyldithiocarbamate to 70 lb. water in a 30 gal., glass-lined Pfaudler tank, cooling to 65–75° F., then adding 24.5 lb. of methyl chlorothiolformate with vigorous stirring over a period of 60 minutes. The mixture was held at 65° F. for an additional 30 minutes, by which time a yellow solid had precipitated. The reaction slurry was cooled to 50° F. and the solids filtered by suction, washed thoroughly with water, and dried in a forced draft oven at 70° F. A yield of 32 lb. (74% theoretical) of bright yellow solids, M.P. 32–33° C., refractive index $n_D^{25}$ 1.6470, was recovered. The following examples illustrate various uses of the compounds of the invention.

Example 2

N,N-dimethylthiocarbamoyl S - methyldithiocarbonate was added in 1 part per million (p.p.m) concentration to 540 gallons of water at 65° F. in a tank and the following fish were placed in the treated water: 10 brown bullheads (5 large, 5 small), 5 golden shiners, 10 yellow perch, 10 pumpkinseed sunfish, 9 white suckers, 5 brown trout, 5 blacknose dace, and with the fish, 2 bullfrog tadpoles. When observed 24 hours later, all the fish were dead, but the tadpoles (which are amphibians rather than fish) were unaffected. It is thus shown that the toxicant is 100% effective within 48 hours when used at 1 p.p.m. concentration in water.

Example 3

The experiment of Example 2 was repeated, using 540 gallons of water containing only 0.1 p.p.m. of N,N-dimethylthiocarbamoyl S - methyldithiolcarbonate, and placing in the tank 10 brown bullheads (5 large, 5 small), 8 golden shiners, 10 yellow perch, 10 pumpkinseed sunfish, 10 white suckers, 2 brown trout, and again 2 bullfrog tadpoles. Two out of two (2/2) trout were dead within 17 hours; 5/10 perch, 1/8 shiners, and 1/10 sunfish were dead within 48 hours. All ten perch and 4/10 sunfish were dead within 144 hours. Only two more fish died between 144 and 192 hours, and no more died up to 18 days. A total of 15 fish survived for 18 days and 5 were unaccounted for (they may have been consumed by the bullheads). The tadpoles were unaffected. Thus it appears that the toxicant of the invention is preferably used at concentrations higher than 0.1 p.p.m. to achieve 100% fish kill. It also appears that the toxicity of the treated water decreases rapidly and is substantially entirely gone by the eighth day.

Example 4

Following the procedure described in Example 1, except that propyl chlorothiolformate was used instead of methyl chlorothiolformate, N,N-dimethylthiocarbamoyl S-propyldithiolcarbonate was prepared. It was a liquid having a refractive index of $n_D^{25}$ 1.6093. It decomposes when heated at or near its boiling point.

Example 5

The compounds of the invention prepared according to the foregoing procedures were tested for activity against various fungi and bacteria by the following procedure. Screening tests against representative microorganisms were performed as follows: Tests against the fungus *Aspergillus niger* were conducted by inoculating the test organisms onto Mycophil agar plates prepared with serial dilutions of the test compounds. The inoculated plates were incubated for 96 hours at 77° F. and the lowest concentration of test compound which completely inhibited fungal growth was recorded in part per million (p.p.m.). Zone of inhibition tests against three representative bacteria, *Bacillus subtilis, Staphylococcus aureus,* and *Salmonella typhosa,* were conducted by placing paper discs dipped in various concentrations of the test compound on agar plates seeded with the test organisms, then incubating the plates for 24 hours at 100° F. The lowest concentration of the test chemical producing a clear zone denoting lack of bacterial growth around the disc was recorded in p.p.m. The results are given in the table below:

| S-alkyl Group | Concentration Inhibiting Growth, in p.p.m. | | | |
| --- | --- | --- | --- | --- |
| | A. niger | B. subtilis | S. aureus | S. typhosa |
| Methyl | 50 | 10 | 50 | 20 |
| Do | 100 | 20 | 50 | 5 |
| Propyl | 100 | 50 | 50 | 20 |

Example 6

The compounds of the invention were tested for their effectiveness in inhibiting the growth of various microorganisms around soap plugs containing 1% of the biocide and inhibiting the growth around hide buttons which had been washed with an 8% solution of the soap, then rinsed and dride. The results are presented in the following table. The figures given outside the parentheses are zones of inhibition around the soap plugs; those in parentheses are zones of inhibition around the hide buttons.

| S-alkyl Group | Zone of Inhibition, in mm. | | |
| --- | --- | --- | --- |
| | B. subtilis | S. aureus | S. typhosa |
| Methyl | 38 (17) | 32 (21) | 25 (14) |
| Do | 32 (9) | 33 (16) | 40 (11) |

Examples 5 and 6 show that the compounds tested have valuable biocidal properties.

Example 7

A vinyl film was made from VYNW vinyl chloride 97%-vinyl acetate 3%-copolymer resin of Union Carbide Company formulated as follows:

| Component | Parts by Weight | |
| --- | --- | --- |
| | Control | Treated |
| VYNW Resin | 100 | 100 |
| Diocytl phthalate | 25 | 25 |
| P-4 brand ricinoleate ester plasticizer | 25 | 25 |
| Stearic acid | 0.3 | 0.3 |
| VANSTAY RRZ brand barium/cadmium/zinc stabilizer | 2.5 | 2.5 |
| Dimethylthiocarbamoyl S-methyldithiolcarbonate fungicide | 0 | 0.75 |

The additives were mixed into the powdered resin and the mix fluxed on a 350° F. mill for five minutes, sheeted off the mill, and cut into samples 2 inches square. Control and treated samples were placed on mineral salts agar and inoculated by pipetting 1 ml. of a mixed spore suspension of *Aspergillus niger, Penicillium citrinium* and *Trichoderma T–1* onto the sample and rotating the plate to spread the inoculum. The inoculated plates were incubated at 75°±2° F. for 14 days, then examined for evidence of growth. Growth of test fungi was rated on the scale:

0=no growth
+=slight growth
++=moderate growth
+++=heavy growth.

The results of the test were—

| Sample: | Growth in 14 days |
| --- | --- |
| Control | +++ |
| Treated | 0 |

Of course, other types of vinyl chloride polymer and copolymer resins may be used instead of the specific compound VYNW used in the foregoing example.

Example 8

Adult pea aphids were sprayed with a 0.35% w./v. (grams per 100 cc.) suspension of dimethylthiocarbamoyl S-methyldithiocarbonate, then transferred to pea plants which had also been sprayed with the same formulation. Mortality, observed after 48 hours, was 60%.

Example 9

Entire lima bean plants infested with strawberry spider mites were dipped into a 0.35% w./v. suspension of dimethylthiocarbamoyl S-methyldithiolcarbonate. The mortality, observed five days after treatment, was 83%.

Example 10

A piece of 8-oz. cotton duck was dipped into an aqueous 1% solution of dimethylthiocarbamoyl S-methyldithiolcarbonate and dried, after which the impregnated cotton duck was buried in biologically active soil for 14 days. The treated sample retained 100% of its tensile strength. while an untreated control sample lost all of its tensile strength during the same exposure. Treated cloth placed on agar inoculated with *A. niger* showed no evidence of mold growth, while untreated cloth exposed in the same manner showed very heavy growth.

Example 11

Naturally occurring paper mill slime was transferred to nutrient broth and subcultured for 7 days. The last broth subculture, representing the mixed bacterial flora existing in the paper mill, was added to sterile, melted and cooled nutrient agar, swirled to achieve good distribution, then distributed to sterile Petri dishes and allowed to harden. Separate filter paper discs 13 mm. in diameter were dipped into each of a range of dilutions of the bactericide, air dried, placed on the inoculated agar, and the plates incubated for 24 hours at 37°±1° C. The plates were then examined for evidence of a clear zone of inhibition of bacterial growth around the treated filter paper discs. The lowest concentration of bactericide exhibiting a clear zone of inhibition was 500 parts per million (p.p.m.) of dimethylthiocarbamoyl S-methyldithiolcarbonate.

The fungicides of the invention may be formulated for use in agriculture by mixing with finely powdered insoluble solids and with wetting and dispersing agents to give wettable powders suitable for mixing into aqueous sprays for application to vegetation, or as dusts suitable for seed treatment, soil application, and for dry application to foliage. Suitable powders for use as diluents include diatomaceous earth, talc, calcium carbonate, magnesium carbonate, the natural clays such as kaolin, pyrophyllite, attapulgite and bentonite, and flour such as walnut shell, wood, and cottonseed flour.

Wetting agents and surface active agents to aid in wetting and dispersing the insoluble n-alkyl, N,N-dimethylthiocarbamoyl thiolcarbonates and powdered diluents for preparation of fungicidal sprays are well known in the art. They include soap, alkali metal salts of sulfonated castor oil or sulfonated olive oil, sulfonated butyl ester of fatty acids, sodium oleyl isethionate, diamyl sodium sulfosuccinate, sulfonated butylamide of coconut fatty acids, sodium oleyl methyl tauride, sodium lauryl sulfate and sodium myristyl sulfate, sodium heptadecyl sulfonate, sodium octyl tripolyphosphate, sodium naphthalene monosulfonate, naphthalene sulfonic acid formaldehyde condensate, alkaryl sulfonates, octadecenyl sulfonate, cellulose sulfite liquid, condensation product of oleyl alcohol with 20 moles of ethylene oxide, polyethylene oxide condensation product with lauryl alcohol, ethylene oxide condensation product with fatty amines or amides, e.g., Armour Ethomides, diethanolamine fatty acid condensate, and ethylene oxide alkylphenol condensate. Reference is also made to Bulletin E-607 of the Bureau of Entomology and Plant Quarantine of the United States Department of Agriculture.

Wettable powder formulations suitable for preparation of fungicidal sprays contain 50% to 90% by weight of N,N - dimethylthiocarbamoyl S - methyldithiocarbonate, 48% to 5% of powdered diluent or carrier, 1% to 5% of a dispersing agent, and 0.5% to 5% of a wetting agent. These materials may be blended in a ribbon blender or other suitable mixer. In order to provide adequate surface of contact they are preferably of a particle size not greater than $10\mu$ and are preferably $3\mu$ or smaller. If necessary, they may be ground to the desired particle size.

The wettable powders may be slurried with water before diluting in the spray tank, or they may be added directly to the tank and mixed with the circulating pump of the tank. They may be applied at once to foliage or to seeded soil.

The following example prepared by the foregoing procedure serves to illustrate but is not intended to limit the scope of the invention.

| Components: | Parts by weight |
|---|---|
| Fungicide | 92 |
| McNamee brand soft clay | 5 |
| Darvan No. 1 [1] brand dispersing agent | 2 |
| Ultrawet K [2] brand wetting agent | 1 |

[1] Sodium salt of polymerized alkyl aryl sulfonic acid.
[2] Alkyl benzene sodium sulfonate.

We claim:
1. The compound having the structural formula

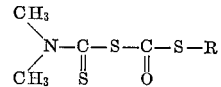

where R represents an alkyl group having from 1 to about 4 carbon atoms.

2. The compound desecribed in claim 1 in which R is methyl.

References Cited

UNITED STATES PATENTS

| 2,600,737 | 6/1952 | Crouch et al. | 260—455 |
| 2,608,572 | 8/1952 | Fischer | 260—455 |
| 2,177,598 | 10/1939 | Herzig et al. | 167—46 |
| 3,076,743 | 2/1963 | White | 167—46 |
| 2,139,935 | 12/1938 | Claudin | 260—455 X |

CHARLES B. PARKER, *Primary Examiner.*

D. R. PHILLIPS, *Assistant Examiner.*